United States Patent [19]
Fields

[11] Patent Number: 5,386,663
[45] Date of Patent: Feb. 7, 1995

[54] MULTIPLE LIVE MOUSE TRAP

[76] Inventor: Grover C. Fields, 17572 St.-Rte. 160, Ewington, Ohio 45686

[21] Appl. No.: 190,377

[22] Filed: Feb. 2, 1994

[51] Int. Cl.⁶ ............................................. A01M 23/08
[52] U.S. Cl. ...................................................... 43/66
[58] Field of Search ......................... 43/66, 64, 74, 61

[56] References Cited

U.S. PATENT DOCUMENTS

| | | | |
|---|---|---|---|
| 1,063,347 | 6/1913 | Hall | 43/66 |
| 3,991,508 | 11/1976 | Petrosky | 43/66 |
| 4,887,381 | 12/1989 | Tieben | 43/66 |

FOREIGN PATENT DOCUMENTS 2017477  10/1979  United Kingdom ..................... 43/66

Primary Examiner—P. Austin Bradley
Assistant Examiner—Jeanne M. Elpel
Attorney, Agent, or Firm—H. Jay Spiegel

[57] ABSTRACT

A mouse trap includes structure facilitating the capture of mice without harming them so that they may be disposed of as desired. The trap includes an entryway having a gravity closed or spring-biased gate having holes which may be filled with bait. Just past the gate is a further bait plate having holes which may also be filled with bait. When a mouse passes through the spring-biased gate and feeds from the plate, the mouse will enter into a chamber which contains further bait. When the gate is closed by gravity, the mouse cannot escape. The bottom of the trap includes a trap door which may be opened to dispose of mice caught in the trap.

9 Claims, 2 Drawing Sheets

MULTIPLE LIVE MOUSE TRAP

BACKGROUND OF THE INVENTION

The present invention relates to a multiple live mouse trap. In the prior art, numerous examples of mouse traps are known. However, Applicant is unaware of any such trap having all of the features and aspects of the present invention.

The following prior art is known to Applicant:
371,693 to McKay
721,531 to Alston
1,339,135 to Richards
1,397,471 to Walker
2,314,247 to Runyan
2,377,967 to Rice
2,475,462 to Rosen
2,825,176 to Floied
4,829,700 to Ha
5,067,271 to Henning
5,094,027 to Smotherman.

None of the above listed United States Patents teaches all of the aspects of the present invention.

McKay teaches an animal trap with two gates which are pivoted by movement of an animal and which pivot into engagement with the floor of the trap to prevent reverse movement of the animal. The present invention differs from the teachings of McKay as contemplating a chamber into which the mouse enters, a gravity hinge or spring-bias on the entry gate and a trap door which may be opened to dispose of caught mice.

Alston teaches a mouse or rat trap including a trap door as well as a cage area for trapping another mouse. The present invention differs from the teachings of Alston as teaching the concept of a gravity closed or spring-biased gate which must be opened by a mouse, which gate includes holes designed to contain bait.

Richards teaches a rat trap including a gate which is normally open but which closes responsive to entry of a rat. The present invention differs from the teachings of Richards as contemplating a gate which is normally closed and which is opened by entry of a mouse.

Walker teaches a tile and sewer trap including a pivotable gate which may be pivoted through movements of an animal and may be moved back to its previous position to prevent reverse movement. The present invention differs from the teachings of Walker for many reasons including the use of a chamber below the entry gate as well as a trap door which may be opened to dispose of mice.

Runyan teaches an animal trap having a normally opened door which is swung to a closed position when an animal is captured therein. The present invention differs from the teachings of Runyan as contemplating a door which is normally closed and which is opened by an animal entering the trap.

Rice teaches a rat trap having a door which is opened by an entering rat and is closed when the rat has passed the door. The present invention differs from the teachings of Rice as contemplating an entry gate having holes therein to receive bait, a subsequent bait plate having holes which may be filled with bait and an opening through which a mouse enters while trying to feed off the bait plate and thence into a bait and holding chamber.

Rosen teaches a mousetrap having an opening which is normally open and which is closed after a mouse passes therethrough. The present invention differs from the teachings of Rosen as contemplating a normally closed gate which is opened by movement of a mouse therethrough.

Floied discloses an animal trap having a closure which is normally open and which is closed when the animal enters the trap. The present invention differs from the teachings of Floied as contemplating a normally closed gate.

Ha teaches an animal trap having a normally open gate which is closed once an animal passes therethrough. The present invention differs from the teachings of Ha for many reasons including the provision of a normally closed gate which is opened by a mouse passing therethrough.

Henning teaches an imprisoning trap having a gate which is opened by a mouse passing therethrough. The present invention differs from the teachings of Henning as contemplating a bait plate leading a mouse to enter through an opening into a closed chamber, as well as the provision of a trap door allowing disposal of mice.

Smotherman teaches a rodent trap having an opening which may be opened through movement of a mouse therethrough. The present invention differs from the teachings of Smotherman as contemplating a bait plate on which a mouse may feed and which allows a mouse to enter into an enclosed chamber, with the present invention including the further provision of a trap door which may be opened to allow disposal of caught mice.

SUMMARY OF THE INVENTION

The present invention relates to a multiple live mouse trap. The present invention includes the following interrelated objects, aspects and features:

(A) In a first aspect, the inventive mouse trap includes an opening which is elevated above the bottom of the trap. Inside the opening, a gravity closed or spring-biased gate is provided which has a plurality of holes therethrough which are configured to receive bait therein. As such, a mouse will be attracted to the gravity closed or spring-biased gate. When the nose of the mouse engages the gravity closed or spring-biased gate, the gate will pivot allowing the mouse entry into the chamber.

(B) Beyond the gravity closed or spring-biased gate, a bait plate is provided which is fixed in position and has a plurality of holes therethrough designed to receive bait therein. Between the gravity closed or spring-biased gate and the bait plate, an opening is formed through which a mouse may descend into a chamber which may have additional bait contained therein.

(C) The floor of the chamber comprises a portion of a chute including a pivotable hinge allowing the chute to be selectively opened to discard mice which are captured in the trap.

(D) In the preferred embodiment of the present invention, all parts, except for metal parts like hinges and the anti-chew plate, are made of a transparent plastic material such as an acrylic plastic.

As such, it is a first object of the present invention to provide a multiple live mouse trap.

It is a further object of the present invention to provide such a mouse trap including a gravity closed or spring-biased, pivotable gate having holes therein to receive bait therein.

It is a further object of the present invention to provide such a mouse trap including a bait plate designed to attract a mouse thereto and located in front of an opening through which a mouse may enter into a bait-filled chamber.

It is a still further object of the present invention to provide such a mouse trap including a chute structure designed to facilitate emptying of the chamber.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
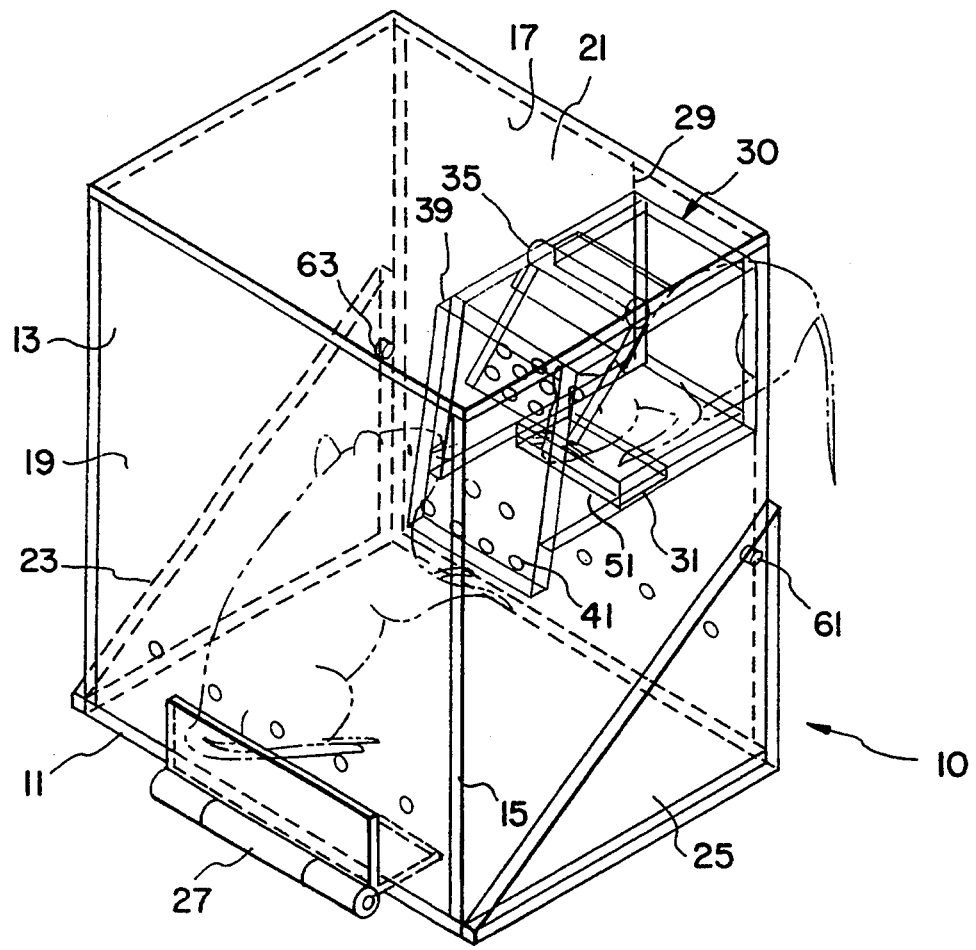
FIG. 1 shows a perspective view of a mouse trap made in accordance with the teachings of the present invention.

With reference, first, to FIG. 1, the present invention is generally designated by the reference numeral 10 and is seen to include a housing having a chamber defined by a base plate or bottom wall 11 defining a floor, side walls 13, 15, a front wall 17, a rear wall 19 and a top wall 21.

The bottom wall 11 has connected thereto wedge-shaped side walls 23 and 25 which together with the bottom wall 11 form a chute which is pivotably mounted on the rear wall 19 by virtue of the tight pin hinge 27. The hinge 27 is a long tight pin hinge which may, if desired, be spring-biased in the direction of closure of the chute in the position shown in FIG. 1.

As also shown in FIG. 1, the top wall 21 has an opening 29 therethrough which leads to a passageway generally designated by the reference numeral 30.

Figure 2:
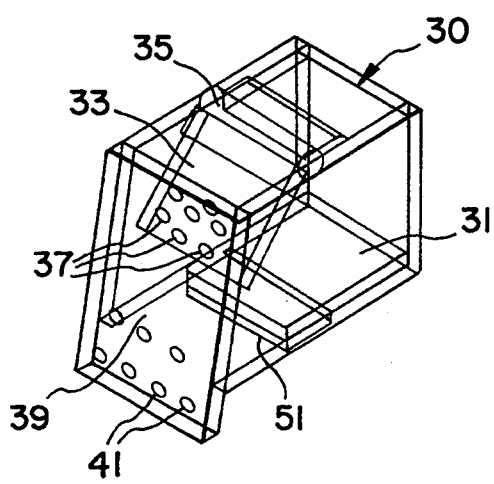
FIG. 2 shows a perspective view of the entry structure of the present invention.

With reference to FIGS. 1 and 2, the passageway 30 includes a lower surface or floor 31 which leads to a gravity closed or spring-biased pivotable gate 33 which is pivoted in the passageway by virtue of the gravity closed or spring-biased hinge structure 35. This hinge structure is better seen with reference to FIGS. 3 and 4. On the front edge of floor 31 is a metal anti-chew plate 51 which prevents the mouse from chewing into the floor 31 spaced above the bottom wall 11 of the chamber.

As seen in FIGS. 1 and 2, the gravity closed or spring-biased gate 33 has a multiplicity of holes 37 therethrough which are designed to receive bait therein so as to tend to attract a mouse thereto as particularly shown in FIG. 1. The hinge 35 is specifically designed to be in loose working order allowing firm closure of the gate 33 yet allowing a mouse to nudge the gate open with the mouse's nose as seen in FIG. 1.

When the gate 33 is pivoted to the open position as shown in FIG. 1, the mouse will be led toward a bait plate 39 which has a plurality of openings 41 therethrough. The bait plate 39 is fixed in position within the inventive mouse trap 10.

Figure 3:
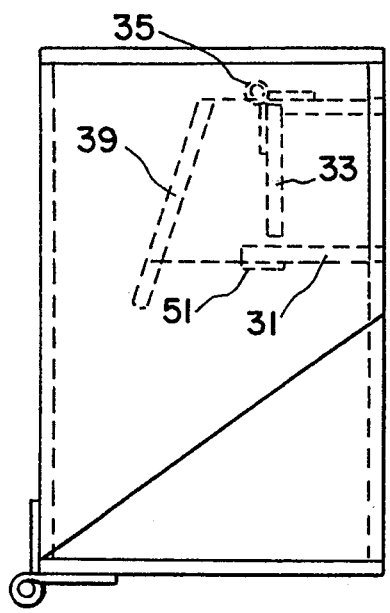
FIG. 3 shows a side view of the present invention with certain interior portions shown in phantom.
Figure 4:
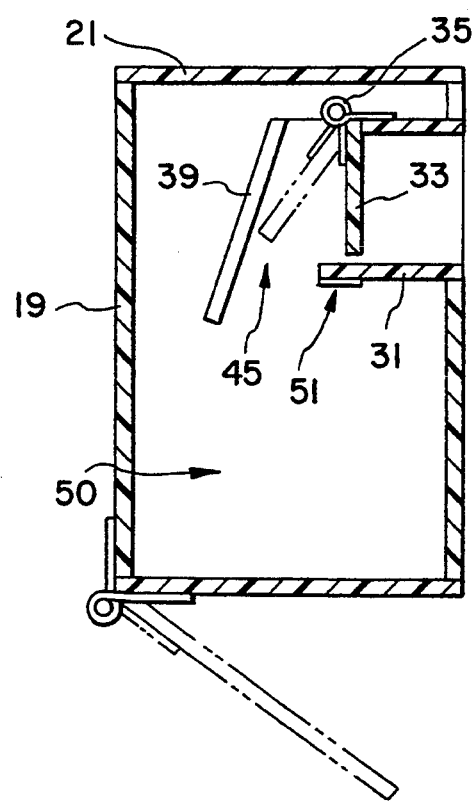
FIG. 4 shows a cross-sectional view through the inventive mouse trap.

As best understood with reference to FIGS. 3 and 4, in the space between the pivotable gate 33 and the bait plate 39, a bottom opening 45 (FIG. 4) is provided so that when a mouse opens the gate 33 and walks toward the bait plate 39 attracted by bait within the openings 41, the mouse will enter into the chamber 50 formed inside the device 10. When this occurs, the gate 33 will pivot under the force of the gravity weight or on the hinge 35 to the position shown in full lines in FIG. 4 closing the passageway 30 and preventing the mouse from escaping in that direction. In order to further facilitate the attraction of the mouse to the bait plate 39, it is preferable to provide additional bait scattered over the bottom surface of the chamber 50 on the bottom wall 11 thereof.

With the above description of the inventive device having been made, the operation thereof should be self-evident. Bait is placed within the holes 37 of the gravity closed or spring-biased gate 33 and also within the openings 41 of the bait plate 39. Additional bait is scattered on the bottom wall 11 of the trap 10. A mouse enters the passageway 30 attracted by the bait within the holes 37 and as the mouse pivots the gate 33 as shown in FIGS. 1 and 2, and in phantom in FIG. 4, the odor from the bait within the openings 41 of the bait plate 39 further attracts the mouse to move forward. When the mouse moves toward the bait plate 39, the mouse steps into the bottom opening 45 and enters into the chamber 50 as best seen in FIG. 4.

When this occurs, the gate 33 pivots closed under the force of the gravity or spring-bias to the position shown in the full lines in FIG. 4 preventing the mouse from escaping through the passageway 30.

The inventive trap may be used to capture a multiplicity of mice simultaneously since the mice are not injured in the capturing process. After a number of mice have been captured, the chute which is formed by the bottom wall 11 and the wedge-shaped side walls 23, 25 may be pivoted downwardly as shown in phantom in FIG. 4 so that the mice caught within the chamber 50 may easily be discarded.

With reference back to FIG. 1, if desired, a pin 61 may be inserted through aligned holes in the wall 25 and the wall 15 to lock the chute in the position shown in FIG. 1. An additional pin 63 may be inserted through correspondingly aligned holes in the wedge-shaped wall 23 and the side wall 13.

As explained above, in the preferred embodiment of the present invention, all of the walls of the present invention as well as the gate 33 and the bait plate 39 may suitably be made of transparent plastic such as an acrylic plastic. Of course, the inventive trap may be made of any other suitable materials such as wood or metal. The anti-chew plate 51 has to be a material such as metal to prevent chewing by the mouse.

As such, an invention has been disclosed in terms of a preferred embodiment thereof which fulfills each and every one of the objects of the invention as set forth hereinabove, and provides a new and useful multiple live mouse trap of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. An animal trap, comprising:
   a) a housing defining an internal chamber having a floor;
   b) an entrance to said chamber spaced above said floor and including:

i) an opening allowing access to a passageway having a lower surface spaced above said floor;

ii) a gate pivotably mounted in said passageway on a generally horizontally disposed pivot, said gate being normally closed within said passageway above said lower surface and having at least one bait-receiving hole therein;

iii) said passageway openly terminating beyond said gate whereby an animal may enter said passageway, may open said gate, pass therethrough and fall into said chamber, said gate closing to prevent escape of said animal through said opening; and iv) said animal trap further including a bait plate mounted adjacent a termination of said passageway, said bait plate having at least one hole therethrough adapted to receive bait therein.

2. The invention of claim 1, wherein said gate is normally closed by gravity.

3. The invention of claim 1, wherein said bait plate is angled with respect to a plane perpendicular to said floor.

4. The invention of claim 1, wherein said floor is pivotably mounted to a wall of said housing, whereby said floor may be pivoted to open said chamber and discard contents thereof.

5. The invention of claim 4, wherein said floor is closed or spring biased to a position thereof closing said chamber.

6. The invention of claim 4, wherein said floor has two sides, each of which has a wedge-shaped side wall mounted thereon to define a chute.

7. The invention of claim 1, wherein said at least one bait-receiving hole comprises a multiplicity of bait-receiving holes.

8. The invention of claim 1, wherein said passageway openly terminates above said floor.

9. An animal trap, comprising:

a) a housing defining an internal chamber having a floor;

b) an entrance to said chamber spaced above said floor and including:

i) an opening allowing access to a passageway having a lower surface spaced above said floor;

ii) a gate pivotably mounted in said passageway on a generally horizontally disposed pivot, said gate being normally closed within said passageway above said lower surface and having at least one bait-receiving hole therein;

iii) said passageway openly terminating beyond said gate whereby an animal may enter said passageway, may open said gate, pass therethrough and fall into said chamber, said gate closing to prevent escape of said animal through said opening; and iv) said floor being pivotably mounted to a wall of said housing, whereby said floor may be pivoted to open said chamber and discard contents thereof.

* * * * *